United States Patent [19]
Satoh et al.

[11] 3,982,770
[45] Sept. 28, 1976

[54] BICYCLE SUSPENSION

[75] Inventors: Takao Satoh, Mori; Kazutaka Horino, Hamamatsu, both of Japan

[73] Assignee: Yamaha, Hatsudoki Kabushiki Kaisha, Iwata, Japan

[22] Filed: Apr. 9, 1975

[21] Appl. No.: 566,210

[30] Foreign Application Priority Data
Sept. 12, 1974 Japan............................ 49-105363

[52] U.S. Cl............................... 280/284; 280/283
[51] Int. Cl.².......................................... B62K 25/20
[58] Field of Search................... 280/284, 283, 275

[56] References Cited
UNITED STATES PATENTS

| 465,599 | 12/1891 | McGlinchey | 280/284 |
| 3,877,539 | 4/1975 | Tilkens | 280/275 |

FOREIGN PATENTS OR APPLICATIONS

| 434,483 | 2/1912 | France | 280/284 |
| 541,451 | 3/1956 | Italy | 280/283 |

*Primary Examiner*—Kenneth H. Betts
*Attorney, Agent, or Firm*—Flynn & Frishauf

[57] ABSTRACT

A bicycle suspension has a suspension frame unit and a shock absorber. The suspension frame unit comprises a pair of parallel triangular members each including a horizontal rear fork arm and a pair of inclined stays with their upper joined portion disposed in a space defined in the main frame of a bicycle. The shock absorber has its one end pivoted to the joined portion of the inclined stays and the other end pivoted to a portion of the main frame a little rearward of the steering head of the bicycle such that the shock absorber is disposed in the space defined within the main frame so as to be operated without being obstructed by the seat tube of the bicycle.

3 Claims, 4 Drawing Figures

BICYCLE SUSPENSION

FIELD OF THE INVENTION

This invention relates to a bicycle suspension for a bicycle including a moped and more particularly to a bicycle suspension designed to absorb and reduce by a shock absorber impacts sustained by the rear wheel while the bicycle is run, wherein tension applied to the drive chain remains substantially unchanged, however vigorously the rear wheel may swing.

DESCRIPTION OF THE PRIOR ART

An ordinary bicycle and a moped (both are hereinafter collectively referred to as "a bicycle") have been developed which absorb and reduce by a shock absorber impacts exerted on the rear wheel from the ground surface while the bicycle is run, thereby enabling a driver to enjoy a comfortable ride. This type of bicycle comprises a rear arm swingably connected to a main frame, a sprocket wheel pivotally supported at the rear end of the rear arm concentrically with the rear wheel and a shock absorber provided between the proximity of the rear end of the rear arm and the main frame, thereby absorbing shocks exerted by the rear arm which swings due to impacts being applied to the rear wheel from the ground surface while the bicycle is traveling, and thus reducing the swing of the arm.

The prior art bicycle provided with a bicycle suspension is the type, wherein the pedal crank shaft is pivotally supported in the main frame and a drive chain is stretched between a drive chain sprocket wheel integral with the crank shaft and a chain sprocket wheel mounted on the rear wheel. Accordingly, such prior art bicycle has the drawback that the swing of the rear arm leads to changes in the distance between the centers of the drive chain sprocket wheel and the sprocket wheel attached to the rear wheel, causing the drive chain to be loosened out of place or unduly strained with increased driving resistance applied to the pedals and in consequence consuming larger manpower.

A further disadvantage of the prior art bicycle is that when the bicycle is constructed, parts are fitted to the main frame in the prescribed sequence, failing to admit of the subassembly type manufacture and consequently resulting in the inefficient assembly of bicycle parts.

It is accordingly an object of this invention to provide a bicycle suspension wherein a pedal crank shaft and rear wheel are fitted to a rear fork to keep the tension of the drive chain unchanged, however vigorously the rear fork may swing, thereby enabling a driver to enjoy a comfortable ride.

Another object of the invention is to provide a bicycle suspension, wherein the pedal crank shaft is mounted in the rear fork at a portion close to the pivotal point of the rear fork on the main frame, thereby minimizing the vertical movement of the pedal crank shaft regardless of the extent to which the rear fork swings and enabling a driver to drive the pedals with greater ease.

Still another object of the invention is to provide a bicycle suspension which admits of application of the unit assembly process to allow a large latitude in choosing the assembling sequence, thereby reducing the working hours of assembly.

SUMMARY OF THE INVENTION

According to this invention, there is provided a bicycle which comprises a main frame; a rear fork extending rearward from the lower end of the main frame; a pivotal member for swingably supporting the forward end portion of the rear fork on the main frame; a rear wheel rotatably supported on the rear end portion of the rear fork by means of a shaft; a rear wheel-driving sprocket wheel rotatably supported on the rear end portion of the rear fork concentrically with the rear wheel; a shock absorber mounted between the main frame and rear fork; a pedal crank shaft mounted in that part of the rear fork which is disposed near the pivotal member; a chain driving-sprocket wheel concentrically fixed to the pedal crank shaft; and a drive chain stretched between the rear wheel-driving sprocket wheel and the chain-driving sprocket wheel.

This invention can be more fully understood from the following detailed description when taken in conjunction with the accompanying drawings.

DETAILED DESCRIPTION

Figure 1:
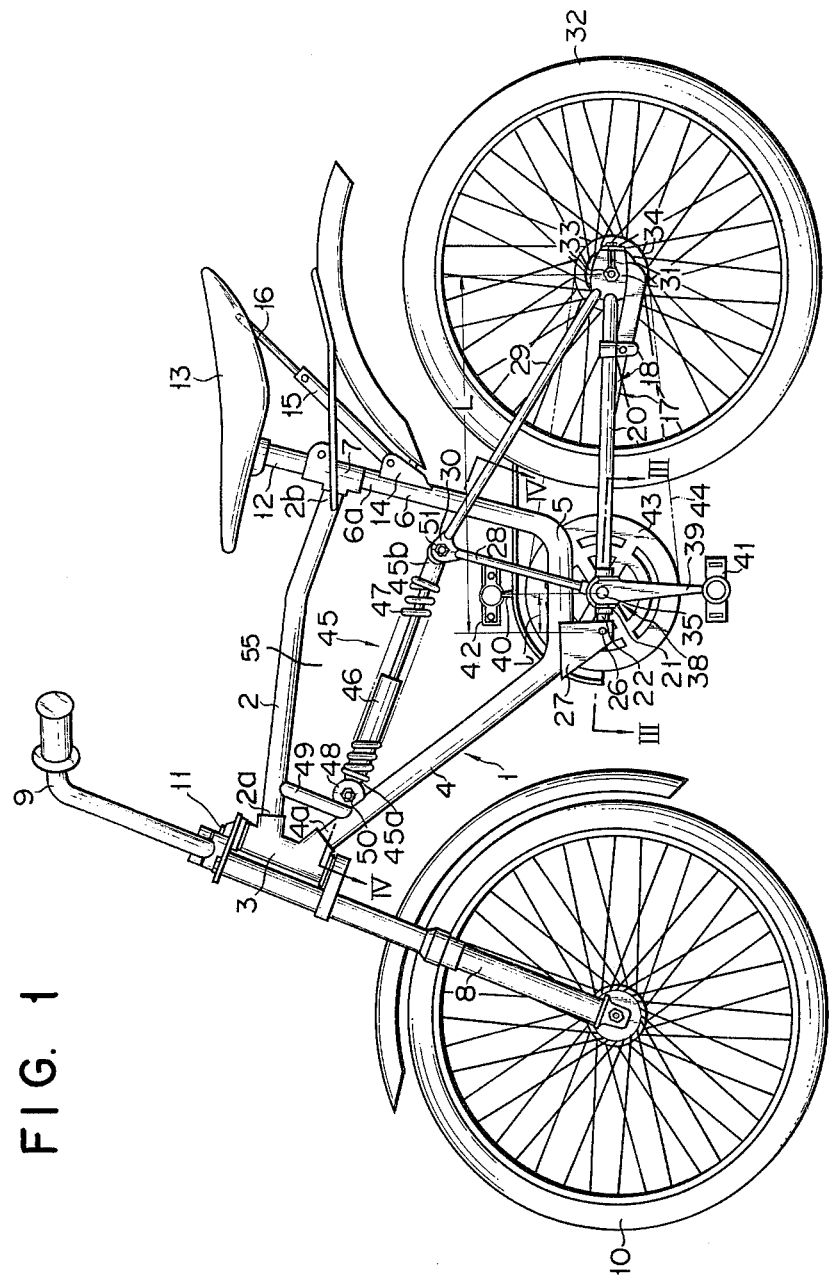
FIG. 1 is a side view of a bicycle according to an embodiment of this invention.

There will now be described by reference to FIG. 1 a bicycle according to an embodiment of this invention. The bicycle includes a main frame 1 which comprises a top tube 2 extending substantially horizontally, a steering head 3 into which the forward end portion 2a of the top tube 2 is inserted, a down tube 4 extending rearward and downward behind the steering head 3 with the upper end portion 4a of the down tube 4 inserted into the steering head 3, a bottom tube 5 horizontally extending rearward of the down tube 4 from the lower end thereof, a seat tube 6 extending substantially in the vertical direction but slightly inclined toward the backside of the rear end of the bottom tube 5, and a joint 7 receiving the rear end portion 2b of the top tube 2 and the upper end portion 6a of the seat tube 6. The main frame 1 has an approximately inverted trapezoidal shape. According to FIG. 1, the down tube 4, bottom tube 5 and seat tube 6 constitute an integral construction. However, these members may be joined together after separately fabricated in advance.

A front fork 8 is rotatably supported by the steering head 3 by means of a bearing 11. The front fork 8 is provided at the upper end with a handle bar 9 and at the lower end with a rotatable front wheel 10.

A seat post 12 is inserted into the joint 7 at the top so as to be adjustable in vertical directions. A saddle or seat 13 is mounted on the upper end of the seat post 12 so as to swing in a vertical plane including the central line of the top tube 2. A bracket 14 is fixed to the rear side of the upper end portion of the seat tube 6. An auxiliary tube 15 is pivoted at the lower end to the bracket 14. Adjustably inserted into the auxiliary tube 15 is an auxiliary post 16, the upper end of which is pivotally supported at the rear end portion of the saddle 13.

Since the seat post 12 and auxiliary post 16 can be set at any desired position relative to the joint 7 and auxiliary tube 15 respectively, the height and inclination of the saddle 13 are freely adjustable to match the stature of the driver and the comfortable ride which he wishes to enjoy.

Figure 2:
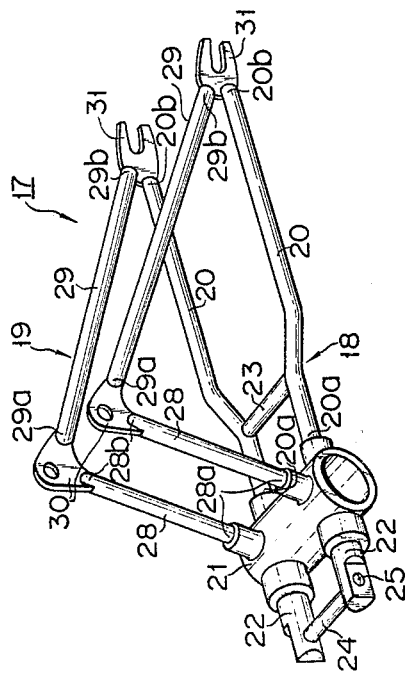
FIG. 2 is an oblique view of the subframe of FIG. 1.

Referring to FIG. 2, a subframe 17 comprises a rear fork 18 and suspension frame unit 19. The rear fork 18 comprises a pair of horizontally extending rear arms 20, a bearing housing 21 formed on the forward ends 20a of the paired rear arms 20 so as to extend crosswise thereof, and a pair of connecting members or an extension 22 projecting forward from the bearing housing 21 in a horizontal direction. To increase the mechanical strength of the rear fork 18, the paired rear arms 20 and paired connecting members 22 are bridged by reinforcing rods 23, 24, respectively. The paired connecting members 22 are each bored with a hole 25 at the forward end. The rear fork 18 is pivotally supported by means of a shaft 26 inserted into the hole 25 at the lower end portion of the main frame 1, namely, on a bracket 27 fixed to the underside of the forward end portion of the bottom tube 5 (FIG. 1).

Referring again to FIG. 2, the suspension frame unit 19 comprises two pairs of stays 28, 29. The forward stays 28 obliquely rise somewhat rearward with the lower end 28a of each stay 28 fixed to the upper surface of the bearing housing 21, while the rear stays 29 incline downward toward the rear side of the bicycle. The upper ends 28b of the paired forward stays 28 are connected to the corresponding upper ends 29a of the paired rear stays 29 by joints 30. The rear ends 20b of the paired rear arms 20 and the corresponding lower ends 29b of the paired rear stays 29 are coupled together by fork ends 31.

Referring again to FIG. 1, a rear wheel 32 is rotatably mounted on the fork ends 31 by means of a shaft 33 passing through the fork ends 31. A rear wheel sprocket wheel 34 is concentrically fixed to the rear wheel 32. As seen from FIG. 1, the bearing housing 21 is disposed near the bracket 27. A distance $l$ between the pivotal point of the rear fork 18 on the main frame 1 or the central line of the shaft 26 and the central line of the later described crank shaft 35 is chosen to be smaller than one-fourth of a distance L between the center point of the rear wheel 32 on the paired rear arms 20 or the central line of the shaft 33 and the pivotal point of the rear fork 18 on the main frame 1 or the central line of the shaft 26.

Figure 3:
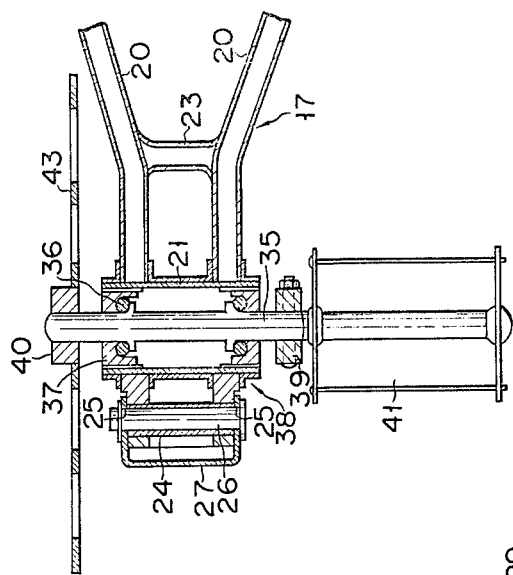
FIG. 3 is a sectional view on line III-III of FIG. 1.

Referring to FIG. 3, the crank shaft 35 is rotatably inserted into the bearing housing 21 through balls 36 and bearing races 37. The bearing housing 21, balls 36 and bearing races 37 jointly constitute a bearing 38 for the crank shaft 35. Both ends of the crank shaft 35 are fixed by cranks 39, 40 provided with pedals 41, 42 (FIG. 1) as in the ordinary bicycle. A sprocket wheel 43 for driving a chain 44 is concentrically fixed to the crank shaft 35 between the crank 40 and bearing 38 (FIGS. 1 and 3). The chain 44 is stretched between the sprocket wheels 34, 43 (FIG. 1).

Figure 4:
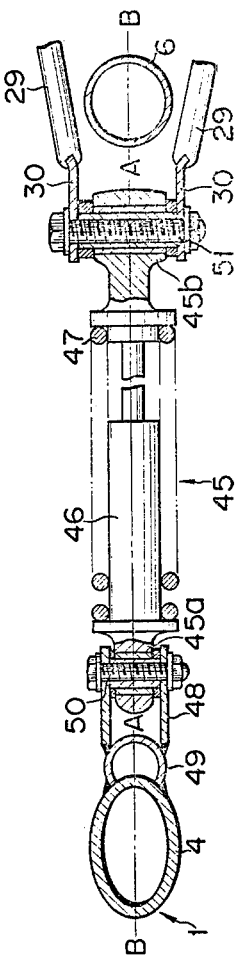
FIG. 4 is a sectional view on line IV-IV of FIG. 1.

Referring to FIGS. 1 and 4 a shock absorber 45 comprising an oil damper 46 and a compression coil spring 47 wound around the damper 46 is swingably supported at one end 45a by means of a bolt 50 on a bracket 48 fixed to the lower end of a stay 49 bridging the top tube 2 and down tube 4 closely behind the steering head 3, and also swingably supported at the other end 45b on the joint 30 by means of another bolt 51. Referring to FIG. 4, which is a sectional view on line IV-IV of FIG. 1, the shock absorber 45 is so positioned that its axial line A—A lies in a vertical plane (whose cross section is shown by line B—B) including the central lines of the main frame 1. Accordingly, the shock absorber 45 does not considerably project from both sides of the main frame 1 even when formed with a large diameter.

The shock absorber 45, therefore, not only carries out damping more effectively than in the prior art bicycle, but also is little subject to damage, since the shock absorber 45 does not hit the ground or other obstructions even if a bicycle falls. As apparent from FIG. 1, the bottom tube 5 extends rearward between the paired forward stays 28. The seat tube 6 obliquely rises somewhat rearward from the rear end of the bottom tube 5 between the paired rear stays 29. Even when, therefore, the subframe 17 swings about the shaft 26, the pivotal point of the rear end 45b of the shock absorber 45 on the subframe 17, namely, the joint 30 is always kept ahead of the seat tube 6 in a space 55 defined by the top tube 2, down tube 4, bottom tube 5 and seat tube 6, preventing the shock absorber 45 from hitting the seat tube 6.

There will now be described by reference to FIG. 1 the operation of the bicycle according to the embodiment of this invention. Where upward or downward acting impacts are applied to the rear wheel 32 when a driver rides a bicycle on a roadway having an irregular surface, then the swing of the rear wheel 32 and subframe 17 about the shaft 26 is attenuated by the shock absorber 45. Therefore, the rear wheel 32 does not considerably jump off the ground, but well follows the ground surface, thereby enabling the bicycle to attain a good road-holding ability.

The sprocket wheels 34, 43 between which the chain 44 is stretched are fixedly mounted on the corresponding shafts 33, 35. When, therefore, the subframe 17 swings about the shaft 26, the center distance $(L - l)$ between the sprocket wheels 34, 43 remains unchanged, preventing the tension of the chain 44 from being varied any way. Accordingly, the driver has only to step down the pedals 41, 42 with a constant force in riding a bicycle. Further, it is little likely that the varied tension of the chain 44 leads to the breakage of the chain 44 or causes it to be loosened out of place.

As previously mentioned regarding the rear fork 18, the bearing 38 is disposed near the bracket 27 or shaft 26 on the rear fork 18, such that the distance $l$ is made smaller than one-fourth of the distance L. The vertical swing of the subframe 17 or the rear wheel 32 leads to the similar movement of the crank shaft 35, cranks 39, 40 and pedals 41, 42 (hereinafter collectively referred to as "a crank mechanism"). However, the amount of movement made by the crank mechanism is only $l/L$ times that of the rear wheel 2. It has been experimentally found that where the vertical swing of the crank mechanism falls within the range of $l/L \leq \frac{1}{4}$, then a driver is not obstructed in operating the crank mechanism nor experiences any uncomfortable ride. Since L $\fallingdotseq$ 50 to 80 cm is applicable to most bicycles, the measurement of $l \leq 12.5$ to 20 cm well serves the purpose. It has also been experimentally proved that $l \leq 6$ to 10 cm substantially prevents the vertical swing of the crank or driving mechanism from giving any harmful effect.

According to the bicycle of this invention, impacts sustained by the rear wheel 32 from the ground surface are received through the shock absorber 45 at that part of the main frame 1 which is disposed near the steering head 3, namely, the bracket 48, eliminating the necessity of providing a support for the shock absorber 45 behind the seat tube 6, as is the case with the known bicycle. Therefore, various advantages result that the main frame 1 can be made compact, is little liable to be bent by a large moment which might otherwise result from the impacts on the rear wheel 32 and is only required to have a small mechanical strength.

The shock absorber 45 has both ends pivotally supported on the bracket 48 and joint 30 respectively and swings about the bracket 48 according to the vertical movement of the rear wheel 32, eliminating the necessity of providing means for fixing the shock absorber 45 and simplifying the construction thereof.

According to the foregoing embodiment, the distance L between the shafts 26, 33, namely, the length of the rear fork 18 is made appreciably larger than (for example, twice) a distance between the shaft 26 and the bolt 51. Accordingly, the swing of the joint 30 about the shaft 26 resulting from that of the rear wheel 32 is considerably smaller than (for example, one half) that of the fork ends 31. Therefore, even when the rear wheel 32 makes a large vertical swing, the shock absorber 45 is little likely to be damaged by limit extension or contraction. In other words, any large vertical movement of the rear wheel 32 can be fully absorbed by the shock absorber 45 without making a maximum or limit stroke.

With a bicycle according to the above-mentioned embodiment of this invention, the bearing 38 receiving the crank shaft 35 is provided on the rear fork 18 closely behind the shaft 26. However, provision of the bearing 38 closely ahead of the shaft 26 attains the same effect.

A shock absorber 45 used in this invention need not be constructed and mounted in the same manner as in the above described embodiment. Any type of shock absorber may be accepted, provided it effectively absorbs and relieves impacts sustained by the rear wheel 32.

It will be noted that this invention is applicable not only to an ordinary bicycle, but also a moped.

Further, where the subframe 17, rear wheel 32, crank shaft 35, cranks 39, 40 and pedals 41, 42 are previously assembled as a unit, the forward ends of the paired connecting members 22 are pivotally supported on the bracket 27 by means of the shaft 26, and the joints 30 are similarly supported at the rear end 45b of the shock absorber by means of the bolt 51, then the unit can be easily mounted on the main frame 1. Conversely, where the shaft 26 and bolt 51 are taken off, the members 17, 32, 35, 39, 40, 41, 42 can be removed as a unit instead of individually. This arrangement has the advantage of prominently saving time and work required for assembly and dismemberment. Therefore, this invention is also applicable to a portable bicycle.

What we claim is:

1. A bicycle suspension for a bicycle having a steering head and a main frame comprising a substantially horizontal top tube extending rearward from the steering head, a down tube extending rearward and downward from the steering head, and a substantially vertical seat tube having the upper end thereof fixed to the rear end of the top tube and the lower end thereof connected to the rear end of the down tube, said bicycle suspension comprising:

a suspension frame unit comprising:
a horizontal rear fork carrying a pedal shaft and a rear wheel at the forward and rear ends thereof, respectively;
an extension forwardly extending from the forward end of the rear fork and rotatably connected to the rear end of the down tube;
a pair of first stays inclined downwardly toward the backside of the bicycle with the seat tube disposed therebetween and having the lower ends thereof fixed to the rear end of the corresponding rear fork;
a pair of second stays inclined upwardly and having the lower ends thereof fixed to the forward end of the corresponding rear fork; and
a pair of joints disposed in a space of the main frame defined by the top, down and seat tubes of the main frame so as to join the upper ends of the first stays to the upper ends of the corresponding second stays in the space of the main frame; and
a shock absorber having one end thereof pivotally connected to said pair of joints and the other end thereof pivotally connected to a portion of the main frame a little rearward of the steering head so as to be disposed in the space of the main frame.

2. A bicycle suspension according to claim 1, comprising a bracket connected to the down tube of the main frame to pivotally support the suspension frame unit at the forward end portion of the extension.

3. A bicycle suspension according to claim 2, wherein said bracket is disposed under the down tube of the main frame.

* * * * *